United States Patent [19]
Nunlist

[11] 3,874,087
[45] Apr. 1, 1975

[54] SURVEYING INSTRUMENT
[75] Inventor: Rene Nunlist, Aarau, Switzerland
[73] Assignee: Kern & Co. AG, Aarau, Switzerland
[22] Filed: Mar. 19, 1973
[21] Appl. No.: 342,882

[30] Foreign Application Priority Data
Mar. 24, 1972 Switzerland.................. 4377/72

[52] U.S. Cl.................. 33/275, 33/284, 250/215
[51] Int. Cl.................. G01c 3/04, G01c 1/02
[58] Field of Search.......... 33/267, 275, 284; 356/4, 356/18; 250/215

[56] References Cited
UNITED STATES PATENTS
1,488,010  3/1924  Kourkene ........................ 33/284
2,998,653  9/1961  Haglund ......................... 33/275 R
3,520,611  7/1970  Picou ............................ 33/267

Primary Examiner—Harry N. Haroian
Assistant Examiner—Richard R. Stearns
Attorney, Agent, or Firm—Murray Schaffer

[57] ABSTRACT

A surveying instrument combining a theodolite or transit and an electro-optical telemeter in which the transmitter and receiver of the telemeter are arranged in gravity-symmetrical relationship with respect to the horizontal axis of the theodolite.

6 Claims, 2 Drawing Figures

SURVEYING INSTRUMENT

BACKGROUND OF THE INVENTION

This invention relates to surveying instruments. More particularly, the invention relates to a surveying instrument comprising in combination a theodolite and an electro-optical telemeter arranged in a gravity-symmetrical manner.

Combinations of a theodolite with distance measuring devices such as telemetering means are known. Generally, however, the telemetering means is arranged laterally parallel to the theodolite telescope, being mounted on the telescope itself or fixed to the telescope support. Consequently, the tilting axis of the instrument has an inherent imbalance which is disadvantageous. Moreover, because of the laterally positioned arrangement of the telemetering means with respect to the tilting axis it is not possible to transit the telescope, that is, to set it to the opposite sighting direction for error compensation. In addition, steep sightings are not possible since the high precision bearings of the tilting axis structure do not permit any heavy weight settings to be made and in relatively steep sightings as the telemetering system swings into a position above the tilting axis the tendency is for the instrument to return to the gravity stable position. Consequently, with known instruments of this type, it is necessary to remove the telemetering means before changing position, such as for transiting or for steep sightings. There exists, therefore, a need for a surveying instrument which includes telemetering means but which does not exhibit the drawbacks mentioned which are inherent in known instruments of this type.

Accordingly, it is a primary object of the present invention to provide a surveying instrument including in combination a theodolite and telemetering means, such as an electro-optical telemeter and which in normal operation, and particularly in transiting, does not require removal of the telemeter before changing position and which is not substantially or at least only slightly encumbered by the telemeter. Numerous other objects and advantages of the invention will be readily apparent to those skilled in the art.

STATEMENT OF THE INVENTION

In accordance with the invention there is provided a surveying instrument comprising in combination a theodolite and telemetering means in which the transmitter and receiver of the telemeter are arranged in a gravity-symmetrical manner with respect to the longitudinal median axis of the telescope of the theodolite so that the assembly can be transited in a vertical plane passing through the longitudinal median axis of the telescope of the theodolite with substantially no imbalance in the assembly.

In order to understand the present invention more fully, reference is directed to the accompanying drawing which is to be taken in conjunction with the following description.

THE DRAWING

DESCRIPTION OF PREFERRED EMBODIMENTS

Figure 1:
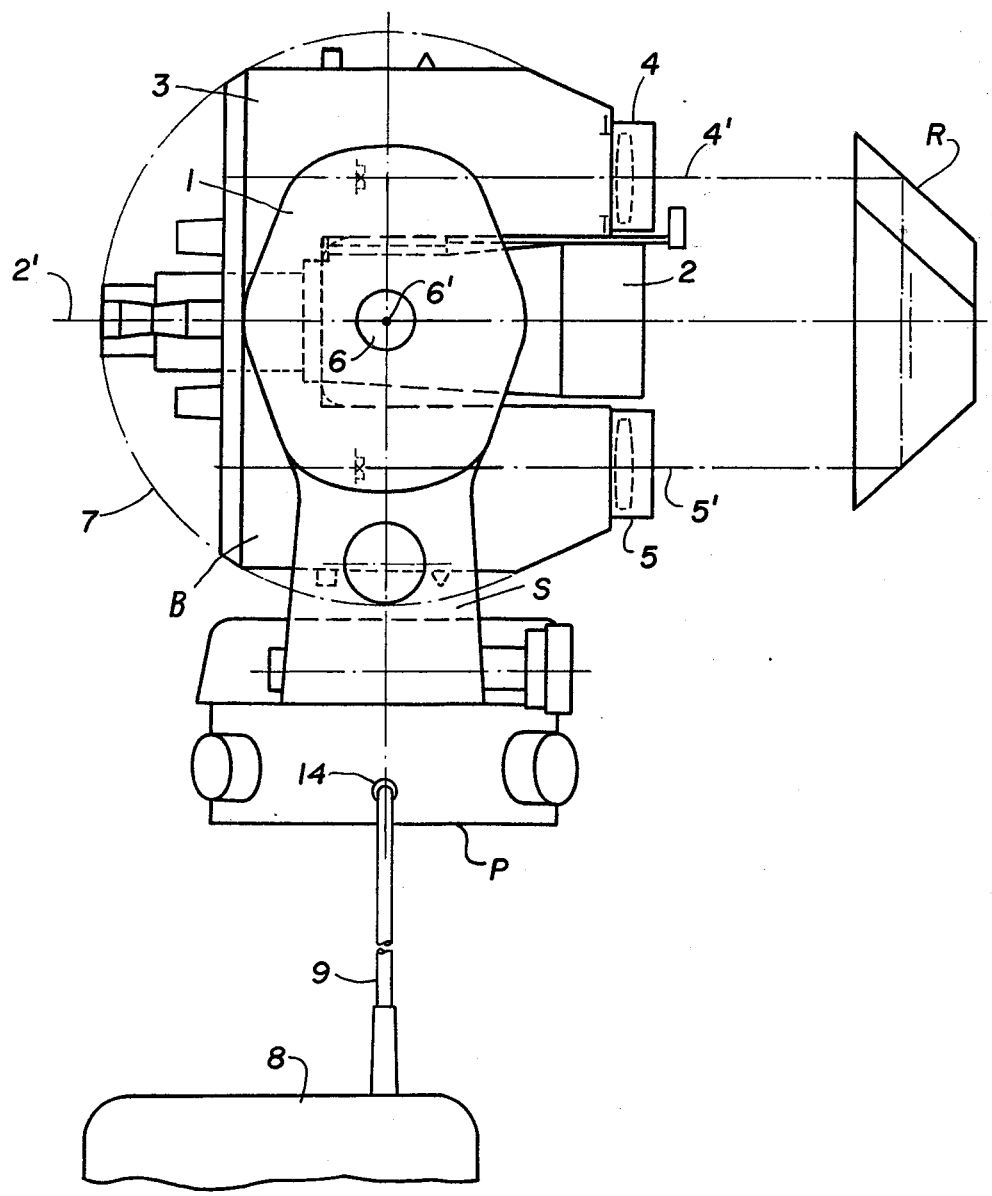
FIG. 1 is an elevational view of a surveying instrument in accordance with the invention showing the general arrangement of the telemetering mechanism and the theodolite, with respect to an associated reflector.
Figure 2:
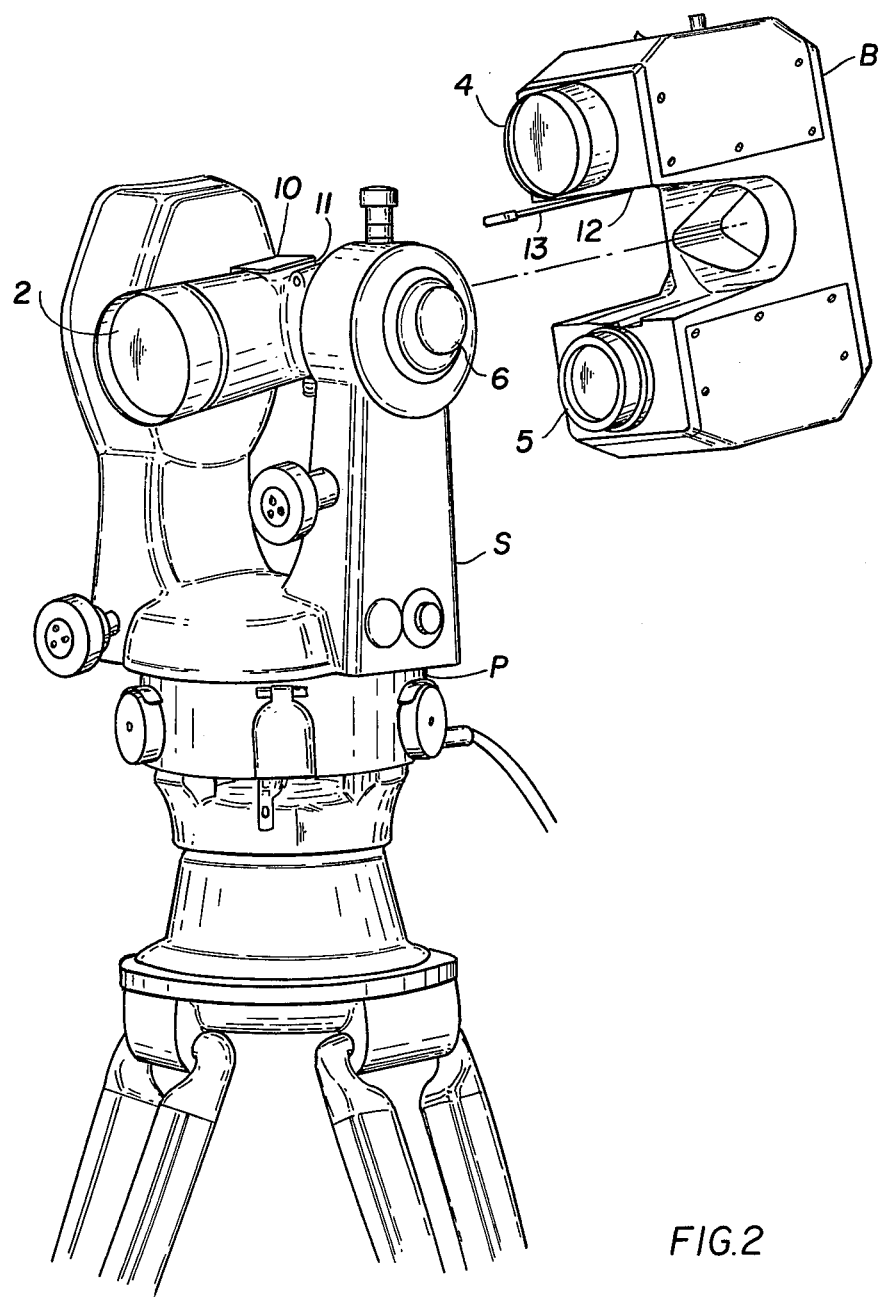
FIG. 2 is an enlarged view of the device showing the telemetering removed from the telescope of the theodolite.

Referring now more particularly to the drawing, the surveying instrument illustrated there comprises a theodolite or transit assembly generally depicted by the numeral 1. The assembly is mounted by conventional means between a pair of vertical standards S fixed to a support plate P. The plate P is secured to a conventional support such as a tripod or table and is adapted to be generally maintained in a horizontal position with respect to ground. The support including vertical standards, horizontal rest plates, etc., are quite conventional and for the sake of brevity are omitted from the disclosure. The plate P does of course include the conventional vertical spindle enabling the assembly to be traversed in a horizontal circle or plane, the tangent screw means to effect such traverse, and the vernier calibrations and markings necessary to read the angles so traversed.

According to the present invention the theodolite or transit assembly includes a telescope 2 having an objective on the right, and an eye piece on the left as seen in drawings. The telescope 2 has a central longitudinal median axis or sight line 2', which is focusable, for example, on a separation reflector device R spaced in front of it. A telemetering mechanism, such as an electro-optical telemeter 3 is mounted about the telescope 2. The telemetering mechanism is conventional; its internal construction comprising an optical (or other radiation) transmitter 4 and a cooperative receiver 5. The transmitter 4 is mounted above the telescope objective while the receiver 5 is mounted below the telescope objective so that their respective median axes 4' and 5' are parallel and lie in a vertical plane passing through the longitudinal median axis of the telescope to thus lie in a common vertical plane with the sight line 2' and substantially parallel to it. The transmitter 4 and receiver 5 are fixedly housed in a U-shaped body B having a hole in its bight through which the telescope 2 passes allowing the telemetering units to surround the telescope. The electronic metering circuits and components of the telemetering mechanism are housed in the body $b$ and comprise conventional units. The lens system are also mounted in the body by conventional means.

The body is removably fastened to the telescope by a "swallow tail" guidance system comprising a plate 10 horizontally disposed on the upper surface of the telescope having opposed bevelled edges 11 which form a swallow tailed plug means. The lower surface of the upper arm of the body $b$ is provided with a correspondingly formed socket plate 12 having parallel clamping lips which are operated by level 13 to close and engage over the bevelled edges 11. Both plates 10 and 12 are aligned so that their center lines lie along the common vertical plane of the sight line 2' and the median axes 4' and 5' respectively. Any other guidance means may be useful for this purpose which can be provided with adjustment means for individual adjustment of the angular position of the body b of the telemetering device with respect to the telescope and simultaneously maintaining symmetrical balance.

The angular positions of the body b of the telemetering device with respect to the telescope is fixed, by adjusting the optical systems within the body with respect to the "swallow tail" plates. Because of the excellent guidance afforded by this type of latching system, further alignment or angular adjustment of the optical systems by the user is not necessary, but can be done if any other guidance means is used. The telemeter mechanism thus can be provided as a self-contained unitary sealed assembly directly from the factory, if the "swallow tail" mechanism is used.

The swallow tail or bayonet type latch, enables the body b to be easily slided on and plugged onto the telescope itself when so plugged or latched to become fixedly secured together for conjoint movement. The latch further insure that the median axes 4' and 5' will be perfectly guided and held in place with respect to the common vertical plane with the sight line 2'. It further insures that the weight of the telemetering device is balanced about the telescope 2.

Suitable clamps, shims, and journal means may be provided to secure the housing b to the telescope 2 so that the two will be fixed together for proper conjoint movement. However, these means should be preferably such that the housing b may be easily removed from the telescope 2 allowing replacement or repair of any part of telemetering mechanisms or to permit the use of the telescope without the telemetering mechanism.

As seen in FIG. 1, the telescope and telemetering apparatus sight on the reflector R along parallel lines and notwithstanding the tilt of the telescope these lines do not vary from each other. The reflector used may be a conventional prism type reflector well known in this art.

The telescope 2 is secured on a horizontal shaft or bar 6 journalled at each end in the spaced vertical standards S. Suitable tangent screws, vernier markings, etc., are provided to enable the telescope to be rotated or tilted accurately about the axis 6' of the bar 6, angularly displacing the objective in the vertical plane. The telemeter transmitter and receiver are arranged so that each respectively lies symmetrically to the top and bottom of the telescope, and its sides, weight and mass is distributed symmetrically, radially about the tilting axis 6'. The outer limits of the housing body b are inscribed in a circle 7 having a radius from the tilting axis 6' less than the distance from this axis to the upper surface of the support plate P, so that the entire instrument can be tilted in an exceptionally wide vertical angle without any interference or collision with the supporting mechanism.

This symmetrical arrangement insures that all effects of gravity are equallized about the tilting axis 6' and are symmetrically distributed. Consequently, tilting of the assembly, even at very steep angles, does not cause any imbalance or unwanted torque on the telescope, the assembly, or the supporting tripod or table. Furthermore, fixing the transmitter 4 and receiver 5 in a housing body b mounted for conjoint movement with the telescope 2 insures that the median axes 4' and 5' always remain parallel to the sight line 2' and in the common vertical plane, no matter to what degree the telescope is tilted.

The transmitter and receiver of the telemeter may be electrical-powered by a battery 8 mounted on the tripod, table, etc. and connected by a flexible cable 9 to a receptacle 14 located on the exterior on the plate P. It may also be powered by a battery housed directly on the housing body b or carried on the supporting plate, care being taken to insure that the gravity-symmetrical balance is maintained. On the other hand, the telemeter may be powered by common electrical supply remote from the assembly and connected thereto by the flexible cable. The flexible cable permits the assembly to be freely tilted without substantial interference from the power supply.

Numerous variations, modifications and changes can be made to the structure described without departing from the spirit of the invention and scope thereof. Therefore, it is to be understood that this disclosure is illustrative and is not to be limited to the illustrated embodiments thereof except as defined in the appended claims.

What is claimed:

1. A surveying instrument comprising in combination supporting means, a theodolite mounted on said supporting means and range finding telemetering means carried by said theodolite in a gravity-symmetrical relationship wherein the center of gravity of said telemetering means lies substantially at the intersection of the horizontal axis and the sighting axis of said theodolite, thereby permitting transiting of the assembly in the vertical plane of said theodolite with substantially no imbalance in the assembly.

2. A surveying instrument according to claim 1 wherein the telemetering means includes a transmitter being mounted above the telescope of said theodolite and said receiver being mounted above the telescope of said theodolite and the longitudinal median axes of said transmitter and said receiver being located respectively above and below said sighting axis of said theodolite.

3. A surveying instrument according to claim 2 wherein said transmitter and receiver are fixedly secured within a housing, and means are provided for removably securing said housing to said telescope for conjoint movement therewith.

4. A surveying instrument according to claim 3 including means for mounting said transmitter and receiver with their median axes parallel to said sighting axis of the theodolite.

5. A surveying instrument according to claim 1 including an electric supply source for the telemetering means mounted on the supporting means.

6. A surveying instrument according to claim 5 including a flexible cable connecting the electrical supply source and the telemetering means.

\* \* \* \* \*